(12) United States Patent
Pelletier et al.

(10) Patent No.: US 9,654,994 B2
(45) Date of Patent: May 16, 2017

(54) DEVICE-TO-DEVICE (D2D) LINK ADAPTATION

(71) Applicant: INTERDIGITAL PATENT HOLDINGS, INC., Wilmington, DE (US)

(72) Inventors: Benoit Pelletier, Roxboro (CA); Paul Marinier, Brossard (CA); Hongsan Sheng, San Diego, CA (US); Kiran K. Vanganuru, San Diego, CA (US); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/142,573

(22) Filed: Apr. 29, 2016

(65) Prior Publication Data
US 2016/0242048 A1 Aug. 18, 2016

Related U.S. Application Data

(63) Continuation of application No. 13/905,885, filed on May 30, 2013, now Pat. No. 9,345,039.
(Continued)

(51) Int. Cl.
*H04W 24/02* (2009.01)
*H04W 72/04* (2009.01)
(Continued)

(52) U.S. Cl.
CPC ............ *H04W 24/02* (2013.01); *H04J 11/00* (2013.01); *H04L 5/005* (2013.01); *H04L 5/14* (2013.01);
(Continued)

(58) Field of Classification Search
CPC ..... H04W 24/02; H04W 24/10; H04W 28/14; H04W 72/0413; H04W 72/0453;
(Continued)

(56) References Cited

U.S. PATENT DOCUMENTS

2011/0275382 A1 11/2011 Hakola et al.
2011/0305179 A1 12/2011 Wang et al.
(Continued)

FOREIGN PATENT DOCUMENTS

WO WO 2013/067685 A1 5/2013
WO WO 2013/100831 A1 7/2013

OTHER PUBLICATIONS

3rd Generation Partnership Project (3GPP), R1-112902, "CSI-RS Configuration and Signalling", Huawei, HiSilicon, 3GPP TSG RAN WG1 Meeting #66bis, Zhuhai, China, Oct. 10-14, 2011, 3 pages.
(Continued)

*Primary Examiner* — Melvin Marcelo
(74) *Attorney, Agent, or Firm* — Condo Roccia Koptiw LLP

(57) ABSTRACT

Channel quality may be measured in a device-to-device (D2D) communication network. The D2D communication network may include one or more D2D wireless transmit/receive units (WTRUs), wherein the D2D WTRUs may communicate using a D2D bandwidth. A D2D WTRU may receive a channel measurement resource configuration corresponding to a channel measurement resource. The D2D WTRU may further receive an RS on the channel measurement resource. The D2D WTRU may measure one or more channel state parameters from the channel measurement resource for a part of bandwidth overlapping with a D2D communication bandwidth, when the RS bandwidth is greater than the D2D communication bandwidth. The D2D WTRU may report the channel state parameters to a con-
(Continued)

trolling entity. The controlling entity may configure a D2D frequency allocation between a transmitting device and a receiving device. The D2D frequency allocation may be based on the time averaged measurement.

30 Claims, 11 Drawing Sheets

Related U.S. Application Data

(60) Provisional application No. 61/798,356, filed on Mar. 15, 2013, provisional application No. 61/653,523, filed on May 31, 2012.

(51) Int. Cl.

| | | |
|---|---|---|
| *H04J 11/00* | (2006.01) | |
| *H04L 5/14* | (2006.01) | |
| *H04W 28/14* | (2009.01) | |
| *H04L 29/12* | (2006.01) | |
| *H04W 72/12* | (2009.01) | |
| *H04L 5/00* | (2006.01) | |
| *H04W 72/08* | (2009.01) | |
| *H04W 24/10* | (2009.01) | |
| *H04W 76/02* | (2009.01) | |

(52) U.S. Cl.
CPC ......... *H04L 61/6022* (2013.01); *H04W 24/10* (2013.01); *H04W 28/14* (2013.01); *H04W 72/0413* (2013.01); *H04W 72/0453* (2013.01); *H04W 72/085* (2013.01); *H04W 72/1215* (2013.01); *H04W 72/1226* (2013.01); *H04W 76/023* (2013.01)

(58) Field of Classification Search
CPC ........... H04W 72/085; H04W 72/1215; H04W 72/1226; H04W 76/023; H04J 11/00; H04L 5/005; H04L 5/14; H04L 61/6022
See application file for complete search history.

(56) References Cited

U.S. PATENT DOCUMENTS

| | | |
|---|---|---|
| 2012/0044815 A1 | 2/2012 | Geirhofer et al. |
| 2012/0300743 A1* | 11/2012 | Kim ............... H04L 5/0091 370/329 |
| 2014/0003262 A1 | 1/2014 | He et al. |
| 2014/0004867 A1 | 1/2014 | Noh et al. |
| 2014/0044040 A1* | 2/2014 | Chen ............... H04W 24/02 370/328 |
| 2014/0185495 A1 | 7/2014 | Kuchibhotla et al. |

OTHER PUBLICATIONS

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

* cited by examiner

DEVICE-TO-DEVICE (D2D) LINK ADAPTATION

CROSS REFERENCE TO RELATED APPLICATIONS

This application is a continuation of U.S. Non-Provisional patent application No. 13/905,885, filed May 30, 2013, which claims the benefit of U.S. Provisional Patent Application No. 61/653,523, filed May 31, 2012, and U.S. Provisional Patent Application No. 61/798,356, filed Mar. 15, 2013, the contents of which are hereby incorporated by reference herein.

BACKGROUND

The recent rise in popularity of smart phones is changing the way people use their wireless devices and how services are offered. For example, location based services are becoming more and more the norm. Likewise, social media applications employing location information are emerging and are expected to grow in use in the near future. It is expected that applications and services involving two or more nearby devices may cause large amount of data traffic in networks. One approach to mitigate the increase in network traffic due to these "Proximity Services" may be to limit the traffic to the cell, for example allowing direct User Equipment (UE)-to-UE and/or device-to-device (D2D) communications and/or to have the eNode-B (eNB) relay the information. This last option reduces the data traffic on the network as the data packets may no longer be carried to the SGSN and back to the originating eNB, thereby offloading the network. This local offload approach may be used when large amount of data is to be exchanged.

The spectacular increase in wireless data services in recent years can be partially attributed to the improvement in radio communications technology. More particularly, the use of link-adaptation has had a large impact on the spectrum efficiency and the improvement in the offered data rates. In mobile wireless communications, the propagation channel experiences fades which varies in time due to the device mobility. Due to this fast fading, the quality of the channel varies and likewise the amount of data that can be carried reliably varies in time. Fast link adaptation allows the transmitter to adapt the amount of data as a function of the channel quality thereby improving the overall spectrum efficiency.

At a high level, link adaptation between, for example, a user's handset and an eNB may entail the transmitter and/or the scheduler determining the characteristics of the propagation channel (also referred to as channel state information or CSI). In practice, this may be implemented via the receiver sending CSI feedback to the transmitter; although sometimes this CSI can be inferred, at least partially, in different ways (e.g. via reciprocity in the case of TDD). In traditional systems such as LTE/LTE-A, HSPA, 802.11, 802.16 and others, the receiver measures the propagation channel and sends the CSI back to the transmitter (in the case of the uplink) so that the scheduling can take advantage of the channel conditions.

SUMMARY

Channel quality may be measured in a device-to-device (D2D) communication network. The D2D communication network may include one or more D2D wireless transmit/receive units (WTRUs), wherein the D2D WTRUs may communicate using a D2D bandwidth. A D2D WTRU may receive a channel measurement resource configuration (e.g., via a radio resource control (RRC) configuration signal) corresponding to a channel measurement resource. The channel measurement resource may include one or more of a subframe, a slot, a resource block (RB), a physical resource block (PRB), or a resource element (RE). The channel measurement resource configuration may further include a reference signal (RS) bandwidth. The D2D WTRU may further receive an RS on the channel measurement resource. The RS may include one or more of a sounding reference signal (SRS), a uplink demodulation reference signal (UL DM-RS), a channel state information reference signal (CSI-RS), a downlink demodulation reference signal (DL DM-RS), a discovery signal, a preamble or a postamble signal. The RS may be a periodic signal or an aperiodic signal.

The D2D WTRU may measure one or more channel state parameters from the channel measurement resource for a part of bandwidth overlapping with a D2D communication bandwidth, when the RS bandwidth is greater than the D2D communication bandwidth. The measuring device may exclude a portion of the RS bandwidth that does not overlap with the D2D communication bandwidth from measurement. The measuring device may limit measurement of the one or more channel state parameters to a portion of the RS bandwidth that may overlap with the D2D bandwidth. The measuring device may determine a measurement bandwidth. The measurement bandwidth may include the portion of the overlap between the RS bandwidth and the D2D bandwidth. The D2D WTRU or measuring device may report the channel state parameters to a controlling entity. The D2D WTRU or measuring device may measure the channel state parameters instantaneously.

The controlling entity may be a transmitting device, a receiving device, or an eNB. The D2D WTRU may measure the channel state parameters include a metric indicative of a channel quality, e.g., channel state information (CSI). The D2D WTRU may measure the channel state parameters on a time average basis and report a time averaged measurement to the controlling entity.

The controlling entity may configure a D2D frequency allocation between a transmitting device and a receiving device. The D2D frequency allocation may be based on the time averaged measurement.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1A:
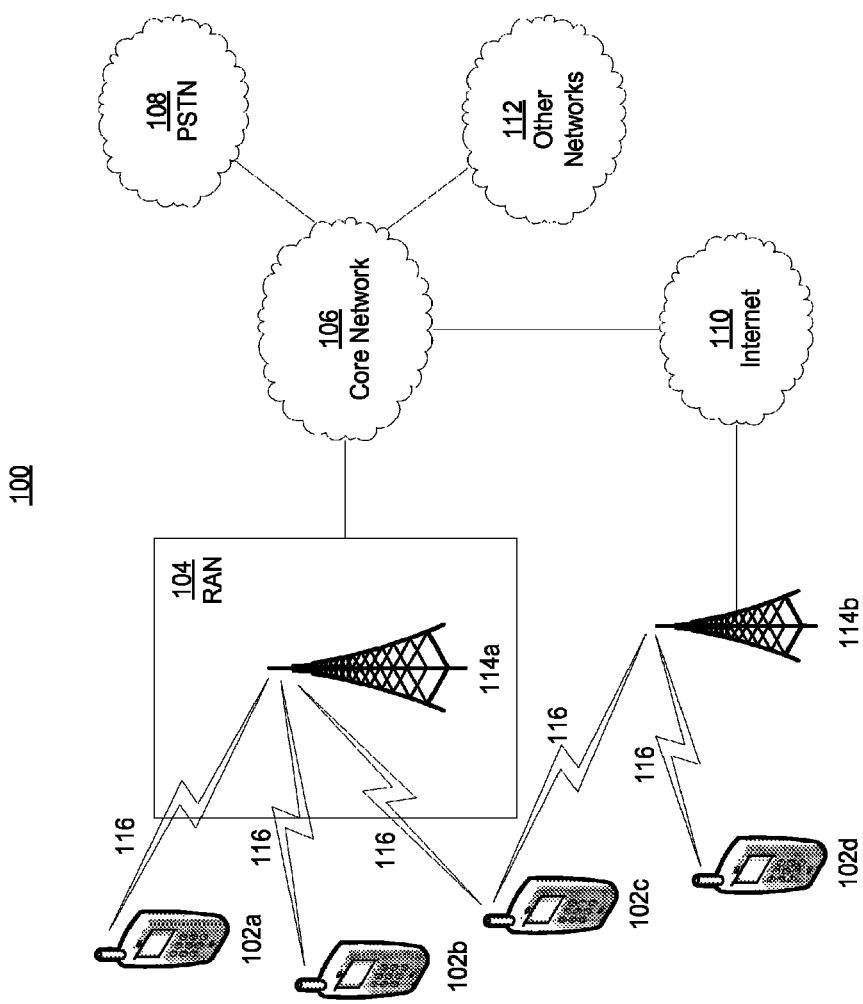
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
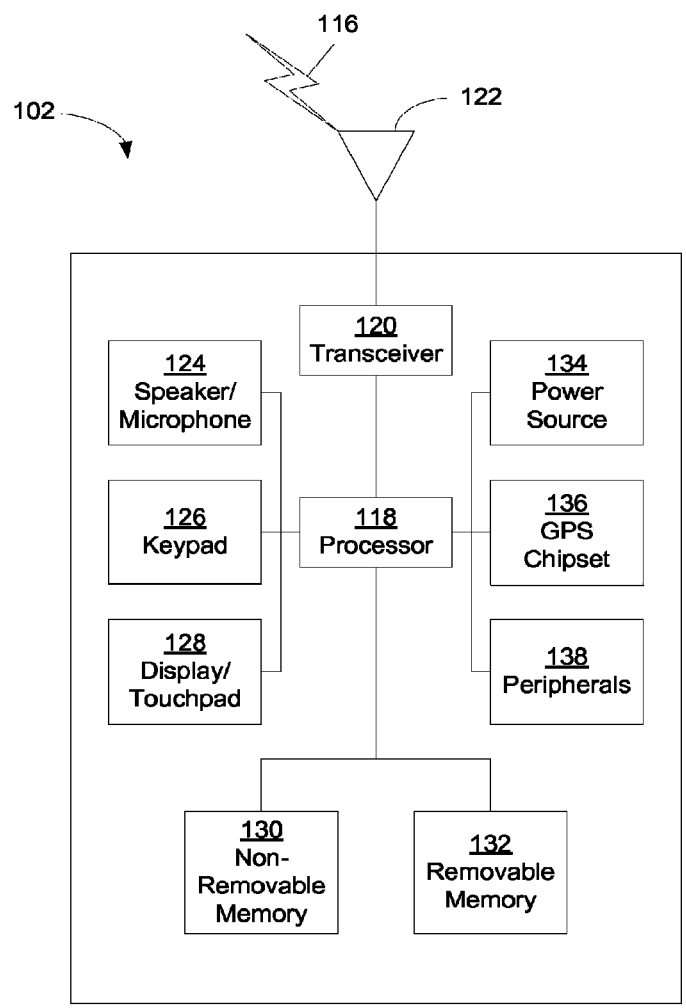
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. It is noted that the components, functions, and features described with respect to the WTRU 102 may also be similarly implemented in a base station.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
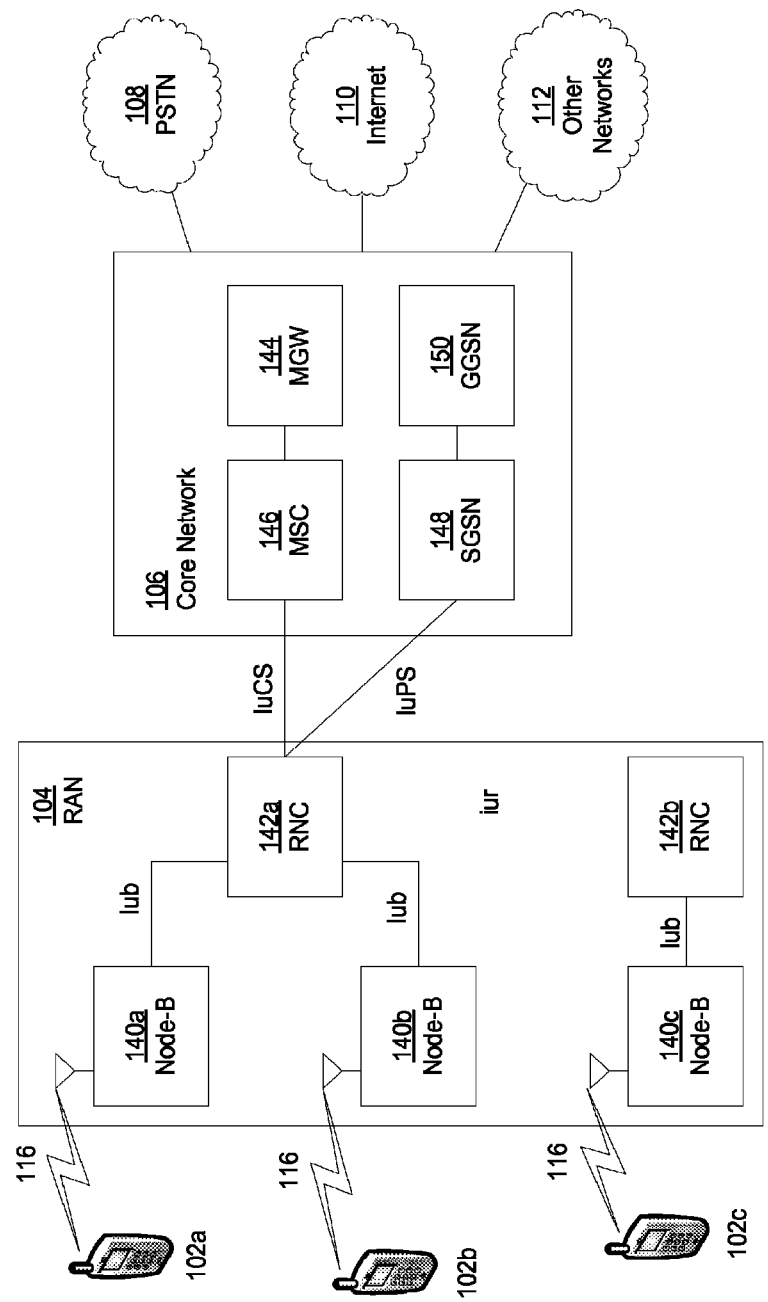
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
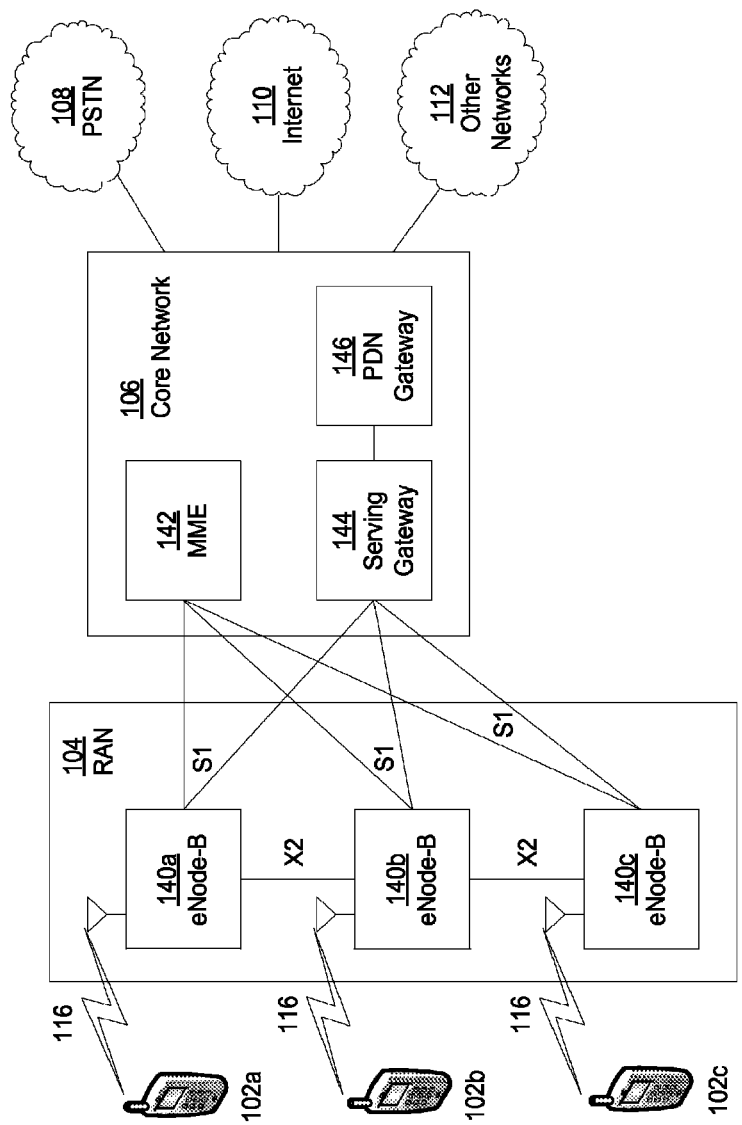
FIG. 1D is a system diagram of another example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
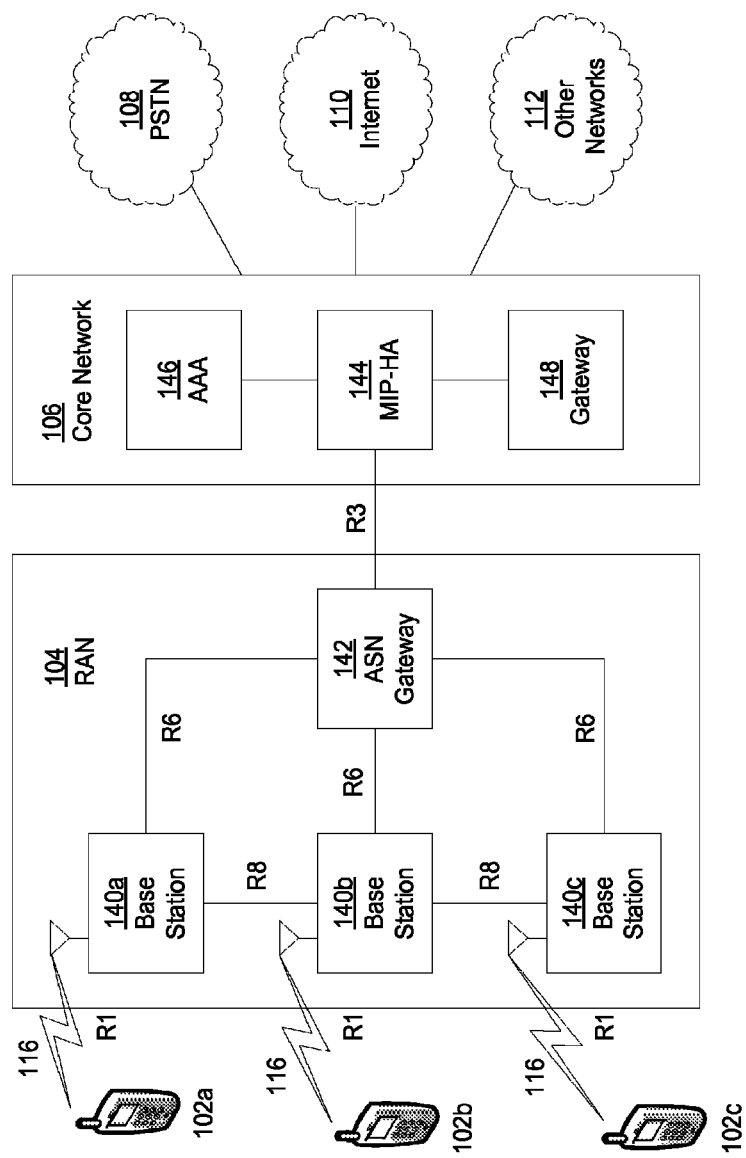
FIG. 1E is a system diagram of another example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

In the context of D2D communications, the link adaptation mechanism may be used to optimize a D2D link. The D2D link may be a communication link between each D2D WTRU. One or more implementations for link adaptation and for measurements associated to link adaptations may be provided. The link adaptation problem in the context of D2D communications may be divided into a number of parts. One problem, for example, may involve how the D2D link channel measurements may be performed by the D2D WTRUs, e.g., what channels may be measured and the associated procedures. Another problem may involve how the D2D WTRUs determine the actual transmission parameters from the measurements. The D2D WTRUs may carry out scheduling, in which case one or more of the transmission parameters such as RB allocation, modulation and coding scheme (MCS), and/or rank may be calculated. Another problem may involve determining the signaling means and procedures to exchange the information.

Methods, systems, and instrumentalities are described herein to determine link adaptation parameters. The link adaptation parameters may be determined by a transmitting WTRU and/or a receiving WTRU. The methods, systems and instrumentalities described herein are exemplary and may be applicable to contexts other than the contexts in which they are disclosed.

Figure 2:
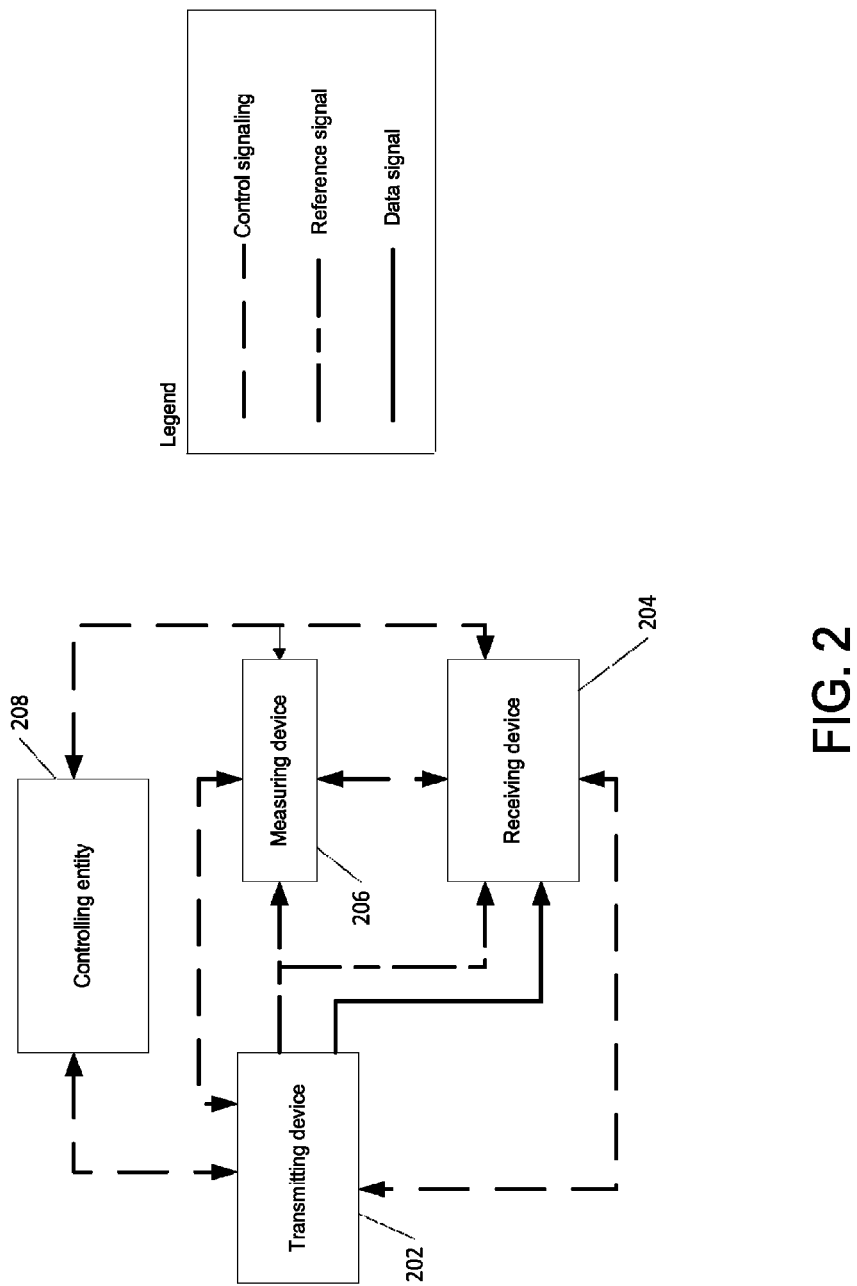
FIG. 2 is a diagram illustrating an example of various device including, e.g., a transmitting device, a receiving device, a measuring device, and/or a controlling entity.

FIG. 2 illustrates a diagram showing an example of devices (e.g., a transmitting device 202, a receiving device 204, a measuring device 206, and/or a controlling device 208). The transmitting device 202 may be a device that may transmit data. The transmitted data may be subject to link adaptation. A receiving device 204 may be a device that may receive data. The received data may be subject to link adaptation. A measuring device 206 may perform channel measurements for link adaptation purposes. A controlling entity 208 may refer to an entity in a device or network node that may determine at least one transmission parameter for link adaptation purposes. The controlling entity 208 may be a part of the controlling device or an eNB. The terms controlling entity and controlling device may be used interchangeably. A forward channel or a direct channel may be a target of link adaptation, e.g., from a transmitting device to a receiving device. A reverse channel may be in a reverse direction from the direct or forward channel, e.g., from a receiving device to a transmitting device. A downlink may be a link (e.g., a traditional link) from a network node, e.g., an eNB, and a device. Link information may include a set of transmission parameters, e.g., a grant, or information that may help the transmitter to decide its transmission parameters, e.g., CSI. A traditional link (TRL) may be a legacy channel transmission between a network node, e.g., an eNB, and a device (e.g., a WTRU). A D2D link or a cross link (XL) may be a link or a channel connection between at least two WTRUs that may directly communicate, transmit, and/or receive data. A D2D WTRU may be a device (e.g., a WTRU) that may be configured to be a part of a D2D link.

Figure 3:
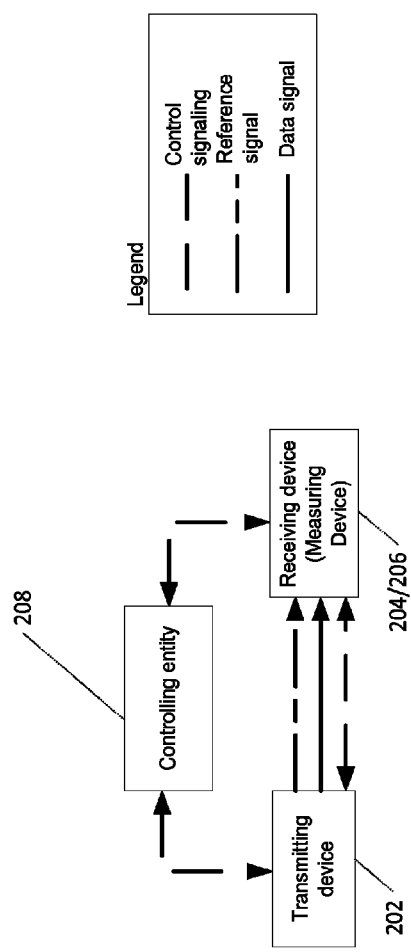
FIG. 3 is a diagram illustrating an example scenario of FIG. 2, where the receiving device may be the measuring device.

FIG. 3 illustrates an example case of FIG. 2, where the receiving device 204 may be the measuring device 206. The measuring device may perform channel measurements. The measuring device may estimate a channel from at least one channel measurement resource. The channel measurement resource may include a known signal (e.g., by a transmitting D2D WTRU and receiving D2D WTRU) transmitted during known REs and subframes, possibly with zero power. The measuring device may estimate the channel and/or the interference from the same channel measurement resource or may use a separate channel measurement resource for this purpose.

The measuring device (e.g., for desired channel measurement and/or interference measurement) may be the receiving device. In this case, the transmitting device may transmit reference signals or mutes for channel estimation. The measurements may provide an estimate of the forward channel.

The measuring device may be the transmitting device. In this case, the receiving device may transmit reference signals or mutes for channel estimation. The measurements may provide an estimate of the reverse channel, and the measuring device or controlling device may derive an estimate of the forward channel based on channel reciprocity.

As illustrated in FIG. 3, the transmitting device may transmit data and a reference signal on the channel measurement resource. It should be understood that the examples disclosed herein may also apply to the case where the measuring device may be a transmitting device. For a given device, its role (e.g., receiving vs. transmitting) may change on a transmission time interval (TTI) basis. For example, a given device may be configured to be transmitting on a subset of TTIs and receiving on another subset of TTIs. A WTRU may change its role dynamically.

To simplify the disclosure, some examples are disclosed in the context of a single reference signal. It should be understood that the disclosed examples may also apply to the case where the WTRUs may be configured with more than one reference signal process with an associated set of parameters. In an example, a reference signal process may include a set of parameters characterizing a set of reference signals, for example, reference signal resource/patterns, periodic cycles, transmission power, type of measurement to perform, and/or report destination (e.g., other transmitting device/controlling entity or eNB).

A measuring device may measure a reference signal from which it may estimate the desired channel. If the receiving device is the measuring device, the transmitting device may be configured to transmit the reference signal over a known set of channel measurement resources. If the transmitting device is the measuring device, the receiving device may be configured to transmit the reference signal on the channel measurement resource.

The measuring device (e.g., assuming that the receiving device is the measuring device) and the transmitting device may be configured with a set of channel measurements resources, e.g., via RRC configuration. The set of channel measurement resources may include a set of subframes, slots, and resource elements (REs), etc. The transmitting device may transmit the reference signal on the channel measurement resources. The reference signal may be a signal or a combination of a number of signals. For example, the reference signal may include a reference signal defined for an LTE uplink (UL), such as SRS or UL DM-RS, based on a Zadoff-Chu (ZC) sequence. An SRS-like signal may be defined for the purpose of D2D CSI measurement. This SRS-like signal may, for instance, occupy a different symbol or more than one symbol in a subframe. As another example, an UL DM-RS-like signal may be defined, for example, using a different or more than one symbol in a subframe. The reference signal may include a reference signal defined for an LTE downlink (DL), such as CSI-RS or DL DM-RS. The reference signal may include a discovery signal, e.g., used for device to device discovery. A discovery signal may be a signal a D2D WTRU may use to advertise its capabilities and/or search for other devices capable of D2D communication. The reference signal may include a preamble or postamble signal, e.g., a special sequence transmitted before and/or after data transmission. The reference signal may include other types of reference signals.

The measuring device may be configured to estimate the channel based on the received reference signal, e.g., as transmitted on the known set of channel measurement resources. The measuring device may be a transmitting device or a receiving device.

Figure 4:
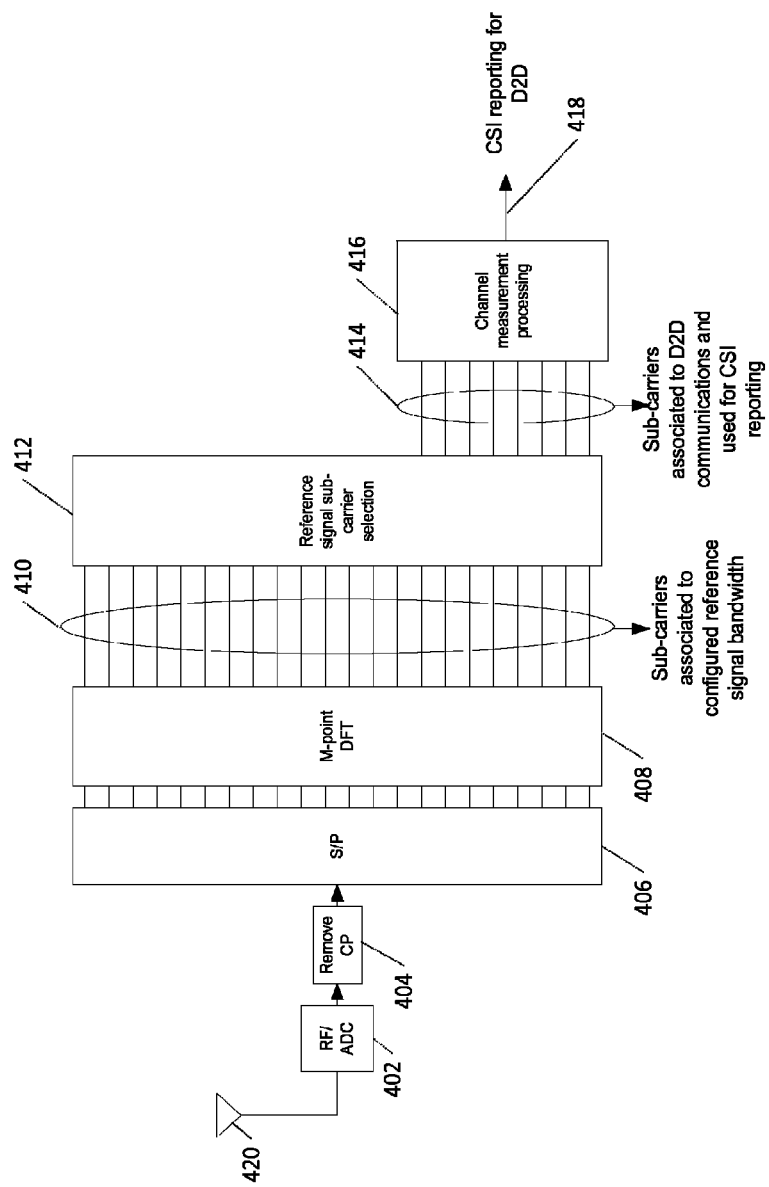
FIG. 4 is a diagram illustrating an exemplary reporting of CSI for the subcarriers overlapping with the allocated D2D communication bandwidth.

FIG. 4 is a diagram illustrating channel measurement and reporting of CSI for the subcarriers overlapping with the allocated D2D communication set of subbands (herein referred to as D2D bandwidth). As illustrated in the FIG. 4, a WTRU may be configured to receive the signal from one or more antennas 420 and process the RF signal so that it can be digitized to baseband using the RF/ADC functionality 402. At 404, the WTRU may remove the Cyclic Prefix. Using a serial to parallel converter 406, the WTRU may convert the samples into a parallel form and may apply an M-point DFT 408 to recover the sub-carriers associated with the wideband reference signal 410. Using a reference signal sub-carrier selection mechanism 412, the WTRU may select a subset of the sub-carriers associated to D2D communications 414. Using the channel measurement processing 416, the WTRU may determine and report the channel state information (CSI) associated with the D2D communications sub-carriers 418. The term bandwidth may be interchangeably used herein with set of subbands. The reference signal may be configured to occupy a larger bandwidth (wideband reference signal) than that occupied by the D2D communications. In that case, the measuring device may be configured to report the CSI for the part overlapping the allocated D2D communication bandwidth.

The measuring device may be configured to measure on a set of channel measurement resources. For example, the measuring device may measure interference on a channel measurement resource. These channel measurement resources may be the same or different from the channel measurement resources used for desired channel estimation. In an example, the measuring device may use one or more of the reference signals for estimating the interference of the transmitted signal and base its estimate on, for example, the variance of the signal. The measuring device may be configured to measure the interference on a set of resource elements in a set of subframes in which the desired device maybe known not to transmit, e.g., zero power. For example, the measuring device may be configured to measure the interference on a whole subframe, e.g., during which the transmitting device is known not to transmit. The measuring device may be configured to measure the interference on a zero-power SRS, e.g., where the transmitting device does not transmit in the last symbol of a certain subframe or set of subframes. The measuring device may be configured to measure the interference on a zero-power symbol, e.g., where the transmitting device does not transmit in a specific time symbol of a certain subframe or set of subframes. The measuring device may be configured to measure the interference on a zero-power subcarrier or resource block(s) or on a zero-power CSI-RS. The measuring device may be configured to measure the interference on a set of resource elements in a set of subframes in which at least one interferer is known to transmit a known signal.

The measuring device may be configured to measure one or more reference signals. The reference signal may span the bandwidth occupied by the D2D communications. The measuring device may be configured to identify these reference signals, for example, based on a scrambling sequence initialized with a known value provided during configuration, the use of a set of resource elements or symbols or subcarriers, and/or other factors.

The reference signals may be transmitted and/or received at specific time instants, e.g., to measure interference. The measuring device and the transmitting device may be configured, for example, via RRC signaling with one or more sets of subframes or sequences of slots or subframes over which the reference signals are transmitted (for the transmitting device) and/or may be measured (for the measuring device). These reference signals may include a zero power transmission, for example, to allow the measuring device to measure the interference.

In an example, a WTRU (e.g., a transmitting device or a receiving device), may be configured to maintain a periodic measurement transmission or reception activation and deactivation status. The WTRU may be activated or deactivated via a L1 (e.g., PDCCH) or L2 (e.g., MAC-CE) message, for example, originating from the controlling device. The controlling device may be an WTRU or an eNB. The transmitting device may be configured to transmit the reference signals according to the configured periodic schedule when it is activated. The transmitting device may be configured to not transmit the periodic reference signal when it is deactivated, or transmit the periodic reference signal according to a longer period. The longer period may be configured or determined by the WTRU based on fixed rules. The receiving device may be configured to receive and act on the reference signals according to a configured periodic schedule when it is activated. The receiving device may be configured to not monitor the periodic reference signal, and not act on it, or may be configured to monitor the periodic signal according to the longer period when it is deactivated.

A WTRU may be configured to determine the activation/deactivation status autonomously. For example, a transmitting WTRU may be configured to activate the reference signal periodic transmission when one or more of the following conditions or triggers are met, either individually or in any combination. The transmitting WTRU may be configured to activate the reference signal periodic transmission when the reference signal periodic transmission is deactivated or the transmitting WTRU had an empty D2D buffer (e.g., a buffer containing data destined to D2D communications, e.g., data from D2D logical channels) and now the D2D buffer is no longer empty, or the transmitting WTRU D2D buffer is above a configured threshold. The transmitting WTRU may be configured to activate the reference signal periodic transmission when a D2D transmission session is configured by higher layers. For example, the transmitting device may be configured (e.g., via RRC configuration) by the controlling device or by the eNB to start a D2D transmission session. The application layer may indicate initiation of a D2D session/transmission. The transmitting WTRU may be configured to activate the reference signal periodic transmission when the frequency resource allocation has changed, e.g., the WTRU has received an indication from the controlling entity or from the eNB that the D2D communication is taking place on a different or new set of PRBs.

The transmitting WTRU may be configured to activate the reference signal periodic transmission when D2D session has been activated or deactivated. For example, the transmitting WTRU may be configured to activate the reference signal periodic transmission when the WTRU has changed its role, for example, from a receiving device to a transmitting device or vice versa.

The transmitting WTRU may be configured to activate the reference signal periodic transmission when the rate of HARQ retransmissions on the D2D link is above a threshold. The transmitting WTRU may be configured to activate the reference signal periodic transmission when the D2D data link block error rate (BLER) is above a threshold. For example, the transmitting WTRU may be configured to activate the reference signal periodic transmission when a channel state information invalidity timer has expired. In an example channel state information validity timer, the transmitting WTRU may be configured with a channel state information validity timer value. The transmitting WTRU may be configured to start the timer when the WTRU deactivates the reference signal periodic transmission. The transmitting WTRU may be configured to stop and reset the timer when the reference signal periodic transmission is activated.

A transmitting WTRU may be configured to activate the reference signal periodic transmission in response to reception of a signal from a measuring device. The signal may include the PUCCH and/or the PUSCH, for example, transmitted from the measuring device. The transmitting WTRU may be configured to activate the reference signal periodic transmission in response to an ACK or NACK signal, e.g., when the ACK or NACK signal is not associated to a particular active data transmission. The conditions or triggers described herein may be used for other purposes in any order or combination, including, e.g., a trigger to transmit an aperiodic reference signal.

The transmitting WTRU may be configured to deactivate the reference signal periodic transmission when one or more of the following conditions or triggers are met in any order or combination. The transmitting WTRU may be configured to deactivate the reference signal periodic transmission when the reference signal periodic transmission is activated and the transmitting WTRU D2D buffer is empty or below a configured threshold and/or an inactivity timer has expired. In an example inactivity timer, the transmitting WTRU may be configured with an inactivity timer value. The transmitting WTRU may be configured to start the timer when the D2D buffer is empty and may be configured to stop and reset the timer when the D2D buffer is no longer empty. The transmitting WTRU may be configured to deactivate the reference signal periodic transmission when the D2D transmission session is terminated or handed over by higher layers, e.g., when the transmitting device is configured (e.g., via RRC configuration) by the controlling device or by the eNB to stop D2D transmission or when the application layer indicates termination of the D2D session/transmission.

When the reference signal periodic transmission is activated, the transmitting WTRU may be configured to perform one or more of a number of actions in any order or combination. The transmitting WTRU may be configured to transmit an indication of the reference signal periodic transmission activation. The WTRU may transmit a control channel indicating activation of the reference signal periodic transmission. The reference signal may be received by the eNB or a controlling entity. The reference signal may be carried, for example, using a PUCCH (e.g., a PUCCH carrying D2D-related information), or as part of a PUSCH (e.g., via MAC-CE or other L2 signaling means). The WTRU may transmit the reference signal over a non-D2D resource at the signal power associated with the conventional radio link, e.g., to the eNB. The eNB may configure the receiving WTRU. The signal may be sent to the receiving WTRU and may be carried on a PUCCH-like channel, e.g., a channel for D2D control information, or on a PUSCH-like channel, e.g., via L2 signaling. The transmitting WTRU may transmit the reference signal over D2D resources at the signal power configured for D2D communications.

The transmitting WTRU may start transmission of the reference signal at the next occasion according to the configured schedule. The transmitting WTRU may be configured to start transmission of the reference signal at the first occasion according to the reference signal transmission schedule, for example after expiration of a wait or validity timer. The transmitting WTRU may be configured to start data transmission, for example, waiting for the CSI feedback from the receiving WTRU before initiating data transmission. The transmitting WTRU may transmit data using a predefined transport block size (TBS) and associated MCS parameters. The transmitting WTRU may transmit data until it receives CSI feedback. The transmitting WTRU may be configured to stop and reset a channel state information invalidity timer.

When the reference signal periodic transmission is deactivated, the transmitting WTRU may be configured to perform one or more of a number of actions in any order or combination, e.g., start a channel state information invalidity timer.

A receiving WTRU may determine activation or deactivation status of the periodic reference signals. For example, the receiving WTRU may be configured to receive an activation status message from the transmitting WTRU. The receiving WTRU may be configured to request activation or deactivation of the periodic reference signals. The receiving WTRU may be configured to transmit the request for activation or deactivation to the controlling device or eNB, or to the peer transmitting WTRU. The request may be carried on a PUCCH or PUSCH (e.g., a new PUCCH or PUSCH), e.g., via MAC-CE. The receiving WTRU may further start monitoring the reference signal a fixed amount of time after transmission of the request or a fixed amount of time after it has received confirmation that the request has been received correctly.

In another example, the receiving WTRU may be configured with an inactivity timer. The receiving WTRU may start the inactivity timer, for example, when no data is received on the D2D data resource. The receiving WTRU may be configured to stop and reset the inactivity timer when data is received on the D2D data resource. The receiving WTRU may be configured to deactivate reception of the periodic reference signal, e.g., upon timer expiration.

When the periodic reference signal state has been deactivated, the measuring device may be configured to perform one or more of a number of actions in any order or combination. The measuring device may be configured to stop monitoring the reference signal and/or stop transmitting the CSI feedback. The measuring device may be configured to monitor the reference signal according to a longer period and report CSI feedback at the appropriate longer period. The measuring device may be configured to transmit an indication of the reference signal deactivation. For example, the measuring device may transmit the indication to the transmitting device using a special PUCCH format or a special MAC-CE on the PUSCH to carry the indication, using, for instance, the power and resources associated with the D2D transmission. The measuring device may transmit the indication to the controlling device or eNB. The measuring device may be configured to transmit, for example, using a special PUCCH format or a special MAC-CE on the PUSCH to carry the indication, using, for instance, the power and resources associated with the link to the eNB or a controlling device. The measuring device may further be configured to stop and reset an inactivity timer upon deactivation. The measuring device may be configured to start the inactivity timer when the periodic reference signal is activated.

The measuring device may be configured to measure the channel and/or interference based on aperiodic triggers. The transmitting device may be configured to transmit reference signals based on aperiodic triggers. For example, the transmitting device and the measuring device may be configured with a set of reference signal parameters, including, for example, the reference signal length and/or bandwidth, root sequence and/or cyclic shift (in the case of Zadoff-Chu sequences). For example, the reference signal may be configured to span a larger bandwidth than what the controlling device or the eNB may have configured for D2D communications (e.g., wideband reference signal). This may allow the controlling device or eNB to determine how to schedule D2D communications over different sets of subbands for example to improve system throughput. The devices may be configured with one or more reference signal parameters in a message from the eNB. The devices may be pre-configured with a subset of the aperiodic reference signal parameters (e.g., sequence root, cyclic shift for the case of Zadoff-Chu sequences, transmission power, etc.), e.g., via RRC signaling. The devices may be indicated the parameters for transmission and/or reception of the reference signal (e.g., index to set of PRBs, or other parameters), e.g., as part of L1/L2 signaling. In an example, the devices may be indicated an index corresponding to a predefined set of parameters (e.g., set of subcarriers, PRBs, etc.) completing the parameters to use for transmitting/receiving the reference signal.

The measuring device may request an aperiodic reference signal. In an example, the measuring device may be configured to request the transmitting device to transmit a reference signal. For example, upon receiving a request signal, the transmitting device may be configured to transmit a reference signal or, alternatively, zero power, if the signal requests interference measurement. The reference signal or zero power may be transmitted at an occasion (e.g., the first occasion). The transmitting device may be configured to transmit the reference signal a configured amount of time after receiving the request. This approach may facilitate synchronizing both devices in time.

One or more of a number of approaches to transmitting the reference signal may be taken. For example, the transmit device may be configured to transmit the reference signal N subframes after receiving the request message. The value of N may be configured by RRC signaling or fixed in applicable specifications. A transmitting device may be configured to transmit the reference signal at least N subframes after receiving the request message during the next allowed slot or subframe. The value of N may be configured by RRC signaling or may be fixed in applicable specifications. The allowed slot or subframe may be configured by the network, e.g., a subset of the slots or subframes may be used for the aperiodic reference signal transmission. In another example, the allowed slots or subframes may be the same as the ones configured for periodic reference signal transmission.

The measuring device may transmit a reference signal request. For example, a signal carrying the request for the reference signal transmission may be transmitted by the measuring device in a number of different ways. The measuring device may be configured to transmit an explicit request signal using, for example, one or more of a number of approaches. For example, the measuring device may be configured to use a special resource, e.g., on the PUCCH or PUSCH, to transmit a reference signal request (RSR). A similar approach using the SR with PUCCH format 1 may be used. The measuring device may be configured to transmit the RSR using a field (e.g., a new field) or replacing an existing bit or field on, for example PUCCH format 3. As another example, a field in a control channel, (e.g., a new control channel) transmitted on a PDCCH or ePDCCH may be used to carry the RSR, for example.

The measuring device may be configured to transmit an RSR, for example, when the D2D link is activated or is being activated, and/or when the measuring device buffer is above or below a configured threshold.

It should be appreciated that, while examples described herein may use the receiving device as the measuring device, the examples may be applicable to other contexts. The reference signal request may be received from the receiving device, e.g., where the reference signal may be transmitted from the transmitting device; the transmitting device, e.g. where the reference signal may be transmitted from the receiving device, thereby exploiting reciprocity in the link; or the controlling device, e.g., an eNB from the downlink.

Figure 5:
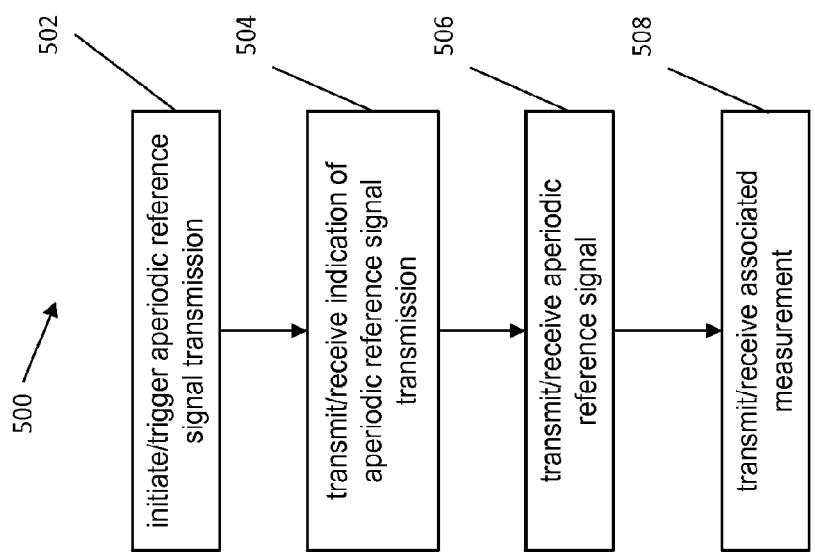
FIG. 5 is a diagram illustrating an example for transmitting an aperiodic reference signal.

The transmitting device may be configured to initiate transmission of the reference signal, for example, in order to obtain CSI for the D2D data transmission from the receiving device. FIG. 5 illustrates an example 500 for transmitting an aperiodic reference signal. Transmission of an aperiodic reference may involve one or more of the actions depicted in FIG. 5. The actions may be in any order or combination. At 502, the aperiodic reference signal transmission may be initialized or triggered. The initiation of the transmission of the aperiodic reference signal may be triggered by the controlling device or by the eNB. This may be used for allowing the controlling device to obtain a measurement of the D2D channel for scheduling radio resources on a system level. The initiation of the transmission of the aperiodic reference signal may be triggered by the transmitting device, e.g., when one or more of the conditions for activating the reference signal periodic transmission is met.

At 504, an indication of the aperiodic reference signal transmission may be transmitted or received. For example, the transmitting device may be configured to transmit an indication of the aperiodic reference signal transmission to the measuring device. The examples of signaling approaches disclosed herein in connection with periodic transmission of reference signals may be applicable. For example, the transmitting device may receive an indication by the controlling device or the eNB to transmit an aperiodic reference signal. The measuring device may also receive an indication from the controlling device or eNB that the reference signal may be transmitted by the transmitting device. This indication may be carried, for example, over the PDCCH. In an example, this signal may be used to reach both transmitting and receiving devices, for example, using a special RNTI common to both transmitting and receiving devices. The transmitting device may be configured to transmit the aperiodic reference signal immediately or at a configured amount of time after the trigger, or when it transmits or receives the indication. Similarly, the measuring device may be configured in the same way. The transmitting device may be configured to wait for a response from the measuring device, e.g., before starting the transmission of the reference signal. At 506, the aperiodic reference signal may be transmitted or received.

At 508, an associated measurement may be transmitted or received. For example, the measuring device may be configured to perform a measurement on the received reference signal and send feedback (e.g., the CSI) to the transmitting device. For example, the feedback may be transmitted on a PUCCH transmitted over D2D resources at the power configured for D2D communications. The measuring device may be configured to perform a measurement on the received reference signal and send feedback (e.g., the CSI) to a controlling device or an eNB. This may be achieved, for example, using an PUCCH, e.g., using an existing or a new PUCCH format transmitted over resources associated with the controlling device or eNB, at an appropriate power level for proper reception.

Some examples may involve multiple reference signal processes. In an example, the devices may be configured with more than one reference signal processes (e.g., periodic and/or aperiodic). For example, a transmitting device may be configured to transmit, in a subframe, a periodic reference signal and at the same time may be configured to transmit an aperiodic reference signal (e.g., probing a different part of the spectrum, for example from a different reference signal process). This may be, for example, to facilitate the eNB to be able to change the D2D link resources to a different set of PRBs.

In the case of overlapping reference signal transmission/reception or conflict between reference signal occasions and other signals, the devices may be configured with a set of rules, to determine the precedence. A number of example rules may be applied in any order or combination. For example, priority may be given to an aperiodic reference signal over a periodic signal. As another example, priority may be given to reference signals associated with measurements to be reported to the eNB. Priority may be given to PUCCH (e.g., carrying CSI information) over periodic reference signals. As another example, priority may be given to an aperiodic reference signal over PUCCH/PUSCH transmission when they conflict.

The reference signal may be designed to coexist with other signals. In such cases, the priority rules may be inapplicable, as there may be no conflict. In another example, the receiving device may be configured to report one or more types of measurements from the same reference signal. The transmitting device may be configured with a single reference signal process, which may, for instance, cover a larger bandwidth than the set of subbands allocated for D2D communications. For example, the transmitting device may be configured for conventional SRS transmission (e.g., potentially hopping in frequency). The measuring device may be configured with more than one reference signal process for reporting purposes, based on the same transmitted reference signal. The measuring device may be configured to report the CSI from the set of subbands in the allocated D2D bandwidth (e.g., in the set of subbands allocated for D2D communications) separately from the other set of subbands. In an example using the SRS, the measuring device may determine the appropriate set of SRS sequence parameters (ZC, cyclic shift, hopping pattern) for the set of subbands allocated to D2D communications from the configured (larger bandwidth) SRS set of parameters. The measuring device may measure and report the CSI for the D2D related subbands when the reference signal from the SRS is known to be transmitted in the set of D2D subbands.

Determining the link adaptation parameters for the D2D link may have a number of challenges, including, for example, varying levels of interference due to a dynamic D2D link schedule and traffic load. There may be mutual interference when sharing resources with TRL. Another challenge may be less accurate channel quality indication (CQI) measurement compared with TRL UL, and/or inaccurate SINR estimation and CQI prediction due to channel estimation error due to duplexing, quantization error, inherent delay of transmission and processing, and/or receiver capability.

To handle these challenges, a number of approaches may be taken. For example, the approaches may include, measurements and prediction considering channel reciprocity for D2D link forward and reverse channels, iteratively adaptive adjustments in CQI prediction, differential CQI feedback, prediction, and/or tracking, CSI PMI feedback with an additional delta between PMI and the ideal CSI. The approaches may, e.g., further include a comparison between a D2D link and TRL UL to determine whether the D2D link offers a higher throughput, interpolation and prediction considering quantization error and other impairments, hierarchical feedback (e.g., more feedback information on a stronger transmitter), or CSI-RS and DM-RS supported CSI feedback.

Some approaches may be based on loop control and adaptation. Link adaptation for the D2D link may combine fast inner loop link adaptation (ILLA) and slow outer loop link adaptation (OLLA). The ILLA may calculate the suitable MCS for the WTRU based on the mapping between the received CQI (e.g., measured SINR from the reference symbols) to the most appropriate MCS for an allocation. The OLLA may adapt the MCS selection to provide a BLER. The target BLER may be set to provide an acceptable or optimal performance, e.g., depending on whether retransmission mechanisms like (H)ARQ are utilized.

The measuring device (e.g., the receiving device or the transmitting device) may perform calculation, for example, based on measurements of the reference signals. Calculations may rely on the eNB taking into account other D2D links in the proximity of the cell.

Exponential effective signal to noise ratio (SNR) mapping (EESM) may be used to translate a block of varying channel SINR values from subbands to an effective wideband SINR value, of which the BLER may be equivalent to that corresponding to the block of varying SINR. The OLLA may impose an offset, referred to as the link adaptation margin, which may be subtracted from the SINR estimate from the CQI measurements before being used by the inner loop LA. The OLLA may control the experienced average BLER for the first transmissions. For example, the offset margin may be increased, if the first transmission is an ACK and decreased if it is an NACK. Positive offsets, e.g., for situations where the OLLA starts with more conservative MCSs, may be changed at a relatively lower pace than in negative offsets, where the MCSs may be more aggressive.

The link adaptation margin may be a fixed value, and adaptively adjusted with an adaptive bias for each WTRU through fast and/or slow adjustment. For TRL UL (e.g., more stable situations), a fixed link adaptation margin may perform better. In this case, functions may be available to disable differential link adaptation such that a fixed optimized link adaptation margin is used. For example, the TRL UL performance may be worse with differentiated link adaptation than with a fixed optimized link adaptation margin. This could be because the TRL UL SINR estimation may be more accurate than in the D2D link. In low estimation error variance, frequent SINR adjustments may make the situation worse.

The link adaptation may be performed on a slow basis, for example, with the same rate of the power control commands to exploit the slowly changing channel variations, or on a faster basis, for example for each of TTIs, to exploit the high instantaneous SINR conditions. Fast link adaptation may be used to adjust the link adaptation margin of each user based on the ACK/NACK feedback for the last transmission. Slow link adaptation may be applied by windowing the ACK/NACK during a time period. The calculated packet error BLER may be used, e.g., based on the traffic model and scheduler.

Some approaches may be based on an announce scheduler. For example, to solve the bursty interference due to dynamic D2D link scheduling, an announce scheduler may pre-allocate the D2D link pairs before the SINR and CQI measurement. The pre-allocated D2D links may provide the WTRU information to predict the future interfered D2D links, e.g., D2D links that may have interference in the future. With the extracted scheduling information, the WTRU may predict CQI when future D2D link interference may appear.

The announce scheduler may be changed to assign different D2D links with a predetermined pattern so the pattern information may not be fed forward in some scenarios. The announce scheduler may apply to a relay WTRU so that the WTRU may use the information to determine whether the D2D link is better than TRL UL and/or the relay link.

To facilitate the announce scheduler, some RSs may be used that may contain information of interfered D2D link power and spatial property. This information may be used by the WTRU with a MMSE type receiver to calculate CQI. Some controlling entities may be used to convey information, such as modulation type, which may be used by the WTRU with an ML receiver. The control information may be accessible to multiple WTRUs, e.g., each of the WTRUs, e.g., using a broadcast approach. The scheduling decisions may be exchanged between a certain set of D2D links via TRL through controlling entities or combined with channel estimate (ChEst) for multiple D2D links. The WTRU may use techniques that may allow a transmitter to estimate path loss to a receiver, e.g., by passively overhearing link messages sent by the receiver.

The WTRU may avoid or mitigate interference through D2D link coordination. For example, this may involve precoding or beamforming with appropriate receiver filters in the case of multiple antennas and feedback of the best and worst D2D link pair choices. CSI independent precoding may be used to pre-assign D2D links assisted with low overhead CSI dependent precoding and power control. The D2D link coordination may involve inter-D2D link interference rejection techniques. A receiver (e.g., an advanced receiver) may be used to reject interference and to amplify a desired signal by weighted signals in combining to increase or maximize SINR. Precoding or beamforming and CIS information from multiple D2D links may be accessible through controlling entities. This coordination may occur in a centralized or a decentralized manner.

Calculation of CQI and MCS may be ignored to save power, e.g., when high interference occurs for some subbands and/or some TTI. For example, in the presence of high D2D link interference, some bandwidth may be restricted, e.g., colliding PRBs may be banned from use in the neighbor D2D link or may be used with restrictions (e.g., with lower power). Scheduling may be delayed, e.g., some WTRUs in the interfering or interfered D2D links may be postponed.

To save reverse channel overhead, wideband CQI reporting may be used as a main feedback mode. In this case, SINR from each of the carriers may be averaged and reported as one CQI representing the entire measured bandwidth. Subband CQI reporting may involve averaging some carriers determined by the parameter frequency granularity conveyed by the controlling entities or known in advance by the WTRUs. Due to the dynamic D2D link properties, the D2D link interference may be weakly correlated with that in subsequent subframes, and the usefulness of CQI feedback for low SINR D2D links may be reduced. A less frequent scheduling decision may be used. A filtering may be used in CQI feedback or estimation to average out temporal interference variations.

In an example, similar to MCS determination, which may adapt to the predicted CQI (from estimated SINR) by selecting the most appropriate MCS, the resource block may adaptively allocate the bandwidth, which may be scalable to the service types, cell load, and/or power limitations for different D2D links. Adaptive bandwidth allocation may select the appropriate portions, such as in a subband, of the bandwidths to different D2D links which may have different cell loads. The adaptive bandwidth allocation may be similar to multi-link diversity.

In an example, a controlling entity for link adaptation (LA) may determine one or more transmission parameters for the transmitting device. Depending on the system architecture, the controlling entity may be located in the eNB, a controlling device, the measuring device, the transmitting device, and/or the receiving device. For conciseness, the following solutions may be disclosed under the assumption of an architecture (e.g., where the controlling entity may be located in the receiving device). It should be understood, however, that the disclosed examples may be applicable to architectures other than the architecture in the context of which they are disclosed.

The controlling entity in the receiving device (or the receiving device directly), for example, may send (e.g., directly) link adaptation information parameters to the transmitting device. The receiving device may use one or more of PUCCH (e.g., using PUCCH format 3), PUSCH (e.g., using a known control information area), PDCCH, and/or ePDCCH to transmit the information. The receiving device may use a channel specifically designed for transmitting link adaptation information parameters.

The controlling entity in the receiving device may transmit the link adaptation information to the transmitting device. In another example, the controlling entity in the receiving device may transmit the link adaptation information to the network, e.g., the eNB. The network in turn may relay this information to the transmitting device.

The controlling entity may be located in the network, for example, in the eNB controlling the D2D link, on in a separate controlling device. The receiving device or the measuring device may transmit measurement information to the controlling entity in the network (e.g., to the eNB). The eNB may calculate the link adaptation parameters and signal the information to the transmitting device. The receiving device may receive and decode the link adaptation parameters transmitted from the eNB in order to decode the associated data transmission.

The transmitting device may receive the transmission parameters from the controlling entity, which may be either in the receiving device or in the eNB. The link information provided by the controlling device may include MCS, RBs, a grant (e.g., in terms of a number of bits), a carrier index, etc. For example, the link information carries the information transmitted on DCI format 0 or 4.

In an example, the transmitting entity may get a subset of the link adaptation parameters and/or an indication from the controlling entity on the network or receiving entity. The transmitting entity may determine on its own the remaining parameters to obtain the full set of transmission parameters. For example, the transmitting entity may receive the link information, which may consist of the CSI (e.g., the number of layers, the precoding, the CQI for each codeword, and/or frequency-selective parameters). Based on the link information, the controlling entity on the transmitting entity may calculate the transport block size and MCS. The calculation may be further based on a logical channel of the data to be transmitted (e.g., using the associated HARQ profile information) and/or an offset derived from an outer-loop link adaptation. This offset may depend on a BLER experienced in past transmission, a target for the link (as configured, e.g., by the network via RRC signaling), and/or outer-loop mechanism parameters (e.g., update increment, filter length or window size, etc.).

The entity (e.g., an WTRU or an eNB) transmitting the link information (e.g., partial or complete) may be configured to transmit the link information. The link information may be transmitted on a periodic basis or following one or more triggers. The entity receiving the link information may be configured to receive this information. In an example of periodic transmission of link information, the entities may be configured with a semi-static period or time offset, for example, via RRC signaling. The actual period/offset applied may further depend on other parameters.

In an example of transmission of the link information, the D2D WTRU or eNB, depending on the architecture, may be configured to transmit the link information a fixed amount of time after the reference signal used for channel measurement is transmitted. For example, if the receiving entity transmits the link information, the receiving entity may be configured to transmit the link information M subframes after the transmitting entity transmitted the reference signal. The entity may be configured to transmit the link information following periodic reference signal transmission or conversely, following aperiodic reference signal transmission.

In case of aperiodic transmission of the link information, the link information may be transmitted after reception of a special request from the transmitting device. For instance, the receiving device (or the controlling eNB) may receive a request from the transmitting device. This request may be transmitted using, for example, L1 or L2 messaging. The receiving device may measure the channel (e.g., the request for link information may be accompanied by an associated reference signal transmitted by the transmitting entity). The receiving device may calculate the link information and/or may transmit the link information to the transmitting entity or to the controlling eNB.

The transmitting device or WTRU may be configured to transmit data following the reception of the link information. The link information may be persistent, and the transmitting device may use the link parameters from the last received link information. The transmitting device may use the link information received to issue a single transmission and the associated HARQ retransmissions. For example, the link information may last for a single subframe. This may be similar to a transmitting device receiving a new grant for each of the transmissions (e.g., except the HARQ retransmissions).

The transmitting device may be configured to start or stop transmission even if it receives link information, for example, if the transmitting device is buffer-limited, or if the transmitting device determines that very strong interference is present.

D2D resource allocation or scheduling may be provided. D2D communications may be scheduled or configured on a set of semi-static subcarriers. The eNB may not control D2D link adaptation parameters. It may be impractical for the eNB to dynamically schedule the D2D resources to take advantage of the frequency selective fading. In case of multi-user scheduling, the eNB may change the D2D frequency allocation(s) so that other WTRUs may be scheduled over that set of resources (e.g., to improve performance). The eNB may determine if the D2D link could use another set of frequency resources. In the case where the D2D link may not provide the expected performance, the eNB, for example, may determine whether or not a different frequency allocation may resolve the link performance issue. The WTRUs involved in the D2D communications may be configured with a set (e.g., special set) of reference signal parameters, for example, according to one or more channel measurement approaches disclosed herein. The measuring device may be configured to report to the eNB or controlling device directly, for instance, using the PUCCH or the PUSCH, with the appropriate power level and timing advance (e.g., those associated to the eNB/controlling device).

The measuring device may be configured to report periodically or following an aperiodic request. The measuring device may be configured to measure the reference signal and calculate one or more metrics indicative of the channel quality (e.g., over a set of predefined subcarriers or resource blocks (RB)). In an example, the WTRU may report an index pointing to an entry in a table of metrics. The metric may include an average throughput, e.g., the measuring device may estimate the average throughput expected from this link assuming a pre-defined transmit power and/or other pre-defined link parameters. The metric may include a transport block size, e.g., the measuring device may estimate the transport block size it could receive with a predefined BLER (e.g., 0.1 BLER at first transmission), under specific reception conditions (e.g., similar to CQI). The metric may include a regular CQI, e.g., the measuring device may be configured to report the CQI as in the legacy mode of operations. The metric may include a D2D Reference signal receive power (D2D-RSRP), e.g., the power of the reference signal as received by the measuring device, averaged over the reporting measurement bandwidth. The metric may include a D2D Reference signal receive quality (D2D-RSRQ), for example, the ratio N×D2D-RSRP/(D2D-RSSI), where N is the number of RBs of the D2D-RSSI measurement bandwidth. The D2D-RSSI in this case may consist of the total received power averaged over the reference signal resources. The metric may include any combination of these metrics, as well as other measurements, such as SINR, SNR, interference power, noise power, etc.

The measuring device may be configured to report channel quality indication spanning a large bandwidth. In an example, the reported bandwidth may be larger than the bandwidth allocated for the D2D communication. The following examples may be used in any order or combination.

The measuring device may be configured to report an independent quality metric for one or more set of subbands within the reference signal configured bandwidth. The measuring device may be configured to perform time-averaging and report the averaged measurement. For example, the measuring device may be configured to measure the discovery signal or a reference signal, which may be hopping in frequency with a known pattern, and report the channel quality metric(s) for each of the configured set of subbands (or PRBs).

The measuring device may be configured to report for each configured set of subbands whether or not a specific quality metric threshold is met. For example, the measuring device may be configured with a quality metric and an associated minimum threshold. The measuring device may report for each configured subband whether or not the measured quality metric is above the threshold. For example, the measuring device may be configured to determine a quality metric based on a set of configured D2D communications subbands. The measuring device may be configured to report for each configured subband whether or not the measured quality metric is above the quality of the currently configured D2D communication subbands. For example, the measuring device may be configured to report for each set of $N_{D2D}$ subbands whether or not the measured quality metric is above the quality of the set of currently configured $N_{D2D}$ D2D communication subbands. The measuring device may be configured to report the first $N_{best}$ set of subbands for which the quality metric is above the threshold.

In yet another example, the measuring device may be configured to report the best $N_{best}$ set of subbands with the associated metric (e.g., one example may be the case where $N_{best}=1$). The measuring device may be configured to not consider the set of subbands used for D2D communications in the set to report. The eNB may determine an alternative set of subbands for D2D communications.

The measuring device may be configured to report the worst $N_{worst}$ set of subbands with the associated metric (e.g., one particular example is the case where $N_{worst}=1$). The measuring device may be configured to not consider the current set of subbands used for D2D communications in the set to report. The eNB may determine an alternative set of subbands for D2D communications, for example, in avoiding the worst subbands if possible.

The measuring device may be configured to report a single metric in a specific subband. The measuring device may determine the subband to report for example based on eNB configuration (e.g., RRC, L2 or L1). The measuring device may be configured to not report for the currently used set of subbands (e.g., for D2D communications). The transmitting device may be configured to determine the transmission parameters and may carry this information to the receiving device. The receiving device may signal information to the transmitting device. For example, the receiving device may carry D2D control information or assignments (e.g., DCI-like or UCI-like) for D2D communications or D2D-CI, to the transmitting device. The PUCCH may be used to carry such assignments. The D2D-CI assignment may be protected in order to provide proper reception and to not limit the data channel performance to the control channel performance. The encoding of the control channel information may be described herein from the perspective of the WTRU transmitting the assignment. An inverse approach may be applied, for example, if the WTRU receives the assignment. For example, the WTRU transmitting the D2D-CI may be configured to transmit the D2D-CI over the PUSCH or the PUSCH associated to the D2D communication link (e.g., similar to the UCI in conventional LTE). In this approach, the WTRU transmitting the D2D-CI may multiplex the data with the control information, for example, using an approach similar to UCI transmission over PUSCH. The control information may also be transmitted over a MAC-CE, for example. When no data is present, the WTRU may revert to one of the other approaches disclosed herein or may transmit the control channel over the PUCCH. The WTRU receiving the assignment may determine the presence of a D2D-CI assignment for example by decoding the header or blindly, by attempting to decode a transport block of a specific size.

To reduce the D2D latency (e.g., overall latency), the D2D-CI may be transmitted separately from the data, e.g., to allow fast decoding. This may further allow a D2D assignment to be applied in the same subframe as it may be applied (or the subsequent subframe). This may be different from an LTE system that may involve, e.g., four subframes to decode and apply the DCI information. The following examples may achieve reduced latency.

Figure 6:
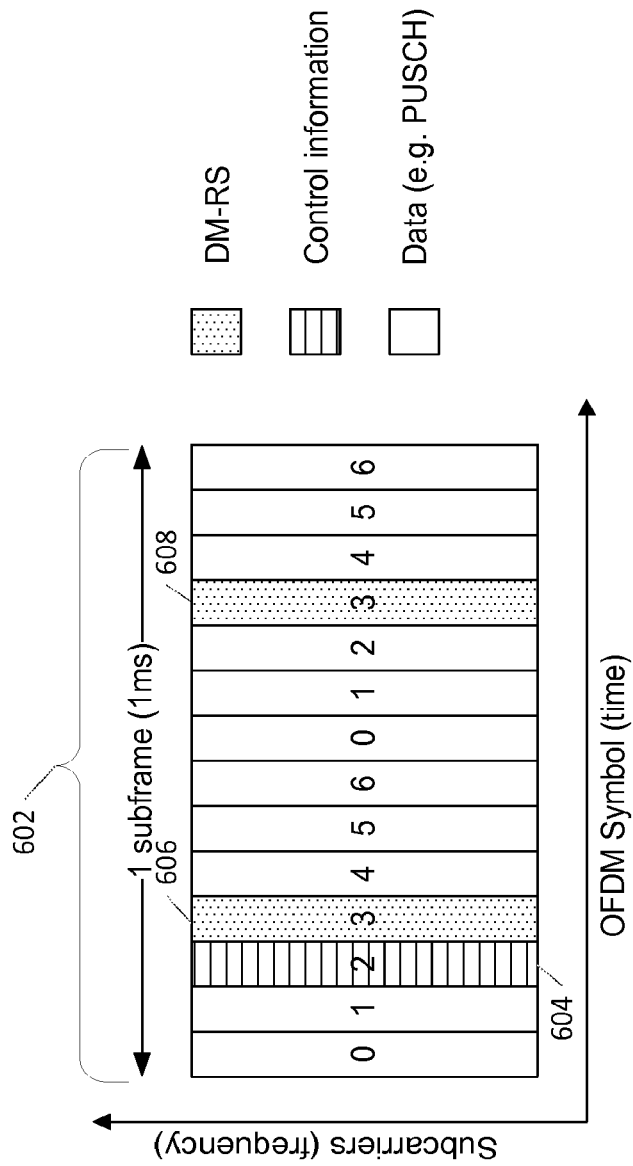
FIG. 6 is a diagram illustrating an example of the control information (e.g., device to device control information (D2D-CI)) that may be transmitted in the OFDM symbol preceding a DM-RS symbol, e.g., on an UL-like subframe.

A WTRU (e.g., to allow reduced latency) may be configured to transmit the D2D-CI on one or more specific OFDM symbols. For example, as illustrated in FIG. 6, on an UL-like subframe 602, the control information (D2D-CI) 604 may be transmitted in the OFDM symbol preceding a DM-RS symbol 606. The receiving WTRU may determine whether or not a symbol carries D2D-CI, for example, by blindly decoding the control channel. A small number of possible sizes may be configured for the control channel, e.g., a concept utilized in the PDCCH.

Figure 7:
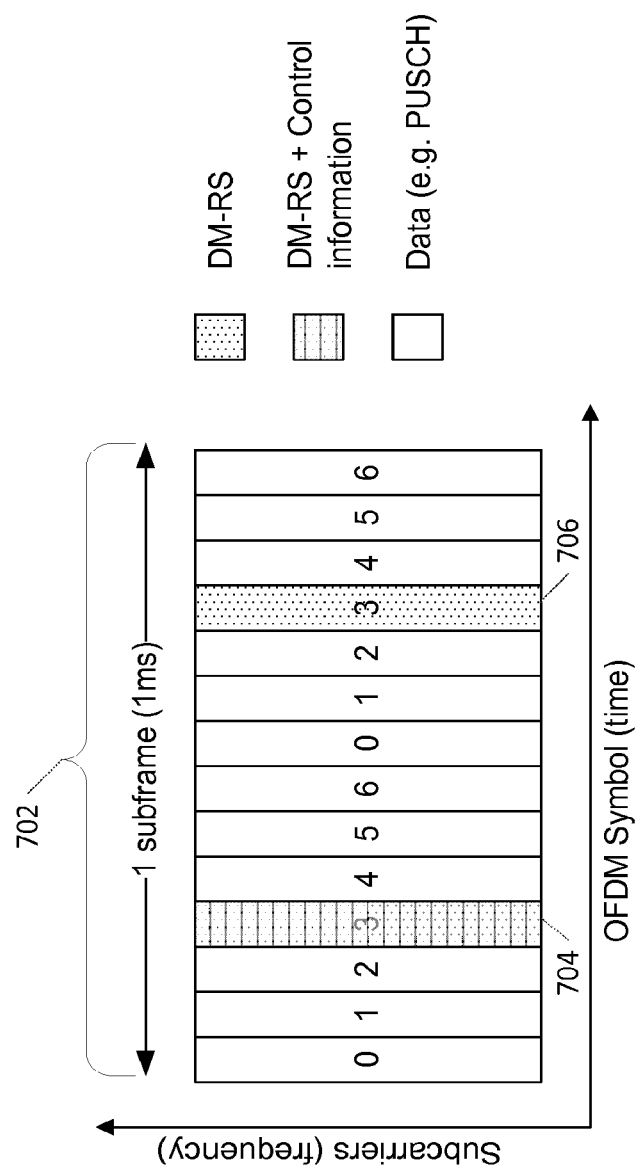
FIG. 7 is a diagram illustrating an example of the control information (e.g., D2D-CI) that may be multiplexed with the first DM-RS symbol, e.g., on an UL-like subframe.

In another example, to reduce latency, the WTRU may be configured to multiplex the D2D-CI with one or both DM-RS symbols. For example, as illustrated in FIG. 7, on an UL-like subframe 702, the control information (D2D-CI) may be multiplexed with the first DM-RS symbol and transmitted on 704. The receiving WTRU may determine whether or not this symbol also carries a D2D-CI for example by blindly decoding the control channel potentially contained in the DM-RS. This may be further simplified by configuring a small number of possible sizes for the control channel, a concept utilized in the PDCCH. The receiving WTRU may use the decoded D2D-CI symbols (e.g., not to degrade the demodulation performance due to the smaller number of DM-RS symbols) as additional (e.g., decision-directed) pilots after decoding of the D2D-CI (e.g., conditioned on the CRC passing).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of sending a reference signal (RS) from a transmitting wireless transmit/receive unit (WTRU) to a receiving WTRU, the method comprising:
    the transmitting WTRU determining an activation/deactivation status, wherein the activation/deactivation status is determined autonomously or based on an activation message received from a controlling device;
    on a condition the activation/deactivation status is activated, the transmitting WTRU transmitting a message to the receiving WTRU indicating an RS transmission activation; and
    the transmitting WTRU starting transmission of the RS to the receiving WTRU.

2. The method of claim 1, on a condition the activation/deactivation status is determined autonomously, the activation/deactivation status is activated when one or more of following conditions are met: RS transmission is deactivated or the transmitting WTRU had an empty device-to-device (D2D) buffer and now the D2D buffer is not empty, the transmitting WTRU D2D buffer is above a threshold, the transmitting WTRU has changed its role from the receiving WTRU to the transmitting WTRU, D2D data link block error rate (BLER) is above a threshold value, or a timer has expired.

3. The method of claim 1, on a condition the activation/deactivation status is received from the controlling device, the activation/deactivation status is received via a physical uplink control channel (PUCCH), a physical uplink shared channel (PUSCH) via a MAC control element (MAC-CE), a D2D PUCCH, or a D2D PUSCH via a MAC-CE.

4. The method of claim 1, wherein the RS transmission activation is sent to an eNodeB or the receiving WTRU.

5. The method of claim 4, on a condition the RS transmission activation is sent to the eNodeB, sending the RS transmission activation using PUCCH or PUSCH via a MAC-CE.

6. The method of claim 4, on a condition the RS transmission activation is sent to the receiving WTRU, sending the RS transmission activation using D2D PUCCH or D2D PUSCH via a MAC-CE.

7. The method of claim 1, wherein the RS is transmitted using a configured schedule.

8. The method of claim 1 further comprising deactivating RS transmission, wherein the RS transmission is deactivated autonomously or based on a deactivation message received from the controlling device.

9. The method of claim 1, on a condition the activation/deactivation status is determined autonomously, the activation/deactivation status is deactivated when one or more of following conditions are met: a transmitting WTRU D2D buffer is empty, the transmitting WTRU D2D buffer is below a threshold, or a D2D session is terminated.

10. A transmitting wireless transmit/receive unit (WTRU) comprising:
a processor configured to:
determine an activation/deactivation status, wherein the activation/deactivation status is determined autonomously or based on an activation message received from a controlling device;
on a condition the activation/deactivation status is activated, the transmitting WTRU transmitting a message to a receiving WTRU indicating a reference signal (RS) transmission activation; and
the transmitting WTRU starting transmission of the RS to the receiving WTRU.

11. The WTRU of claim 10, on a condition the activation/deactivation status is determined autonomously, the activation/deactivation status is activated when one or more of following conditions are met: RS transmission is deactivated or the transmitting WTRU had an empty D2D buffer and now the D2D buffer is not empty, the transmitting WTRU D2D buffer is above a threshold, the transmitting WTRU has changed its role from the receiving WTRU to the transmitting WTRU, D2D data link block error rate (BLER) is above a threshold value, or a timer has expired.

12. The WTRU of claim 10, on a condition the activation/deactivation status is received from the controlling device, the activation/deactivation status is received via a physical uplink control channel (PUCCH), a physical uplink shared channel (PUSCH) via a MAC control element (MAC-CE), a D2D PUCCH, or a D2D PUSCH via a MAC-CE.

13. The WTRU of claim 10, wherein the RS transmission activation is sent to an eNodeB or the receiving WTRU.

14. The WTRU of claim 13, on a condition the RS transmission activation is sent to the eNodeB, the processor is further configured to send the RS transmission activation using a physical uplink control channel (PUCCH) or a physical uplink shared channel (PUSCH) via a MAC-CE.

15. The WTRU of claim 13, on a condition the RS transmission activation is sent to the receiving WTRU, the processor is further configured to send the RS transmission activation using D2D PUCCH or D2D PUSCH via a MAC-CE.

16. The WTRU of claim 10, wherein the RS is transmitted using a configured schedule.

17. The WTRU of claim 10, the processor is further configured to deactivate RS transmission, wherein the RS transmission is deactivated autonomously or based on a deactivation message received from the controlling device.

18. The WTRU of claim 10, on a condition the activation/deactivation status is determined autonomously, the activation/deactivation status is deactivated when one or more of following conditions are met: a transmitting WTRU device-to-device (D2D) buffer is empty, the transmitting WTRU D2D buffer is below a threshold, or a D2D session is terminated.

19. A method of receiving a reference signal (RS) from a transmitting wireless transmit/receive unit (WTRU) to a receiving WTRU, the method comprising:
the receiving WTRU sending a RS request to a controlling device;
the receiving WTRU receiving, from the transmitting WTRU, a message indicating an RS transmission activation;
the receiving WTRU monitoring an RS from the transmitting WTRU; and
the receiving WTRU transmitting a channel state information (CSI) feedback to the transmitting WTRU.

20. The method of claim 19, wherein the RS request to is sent to the controlling device via a physical uplink control channel (PUCCH), a physical uplink shared channel (PUSCH) via a MAC-CE, a D2D PUCCH, or a D2D PUSCH via a MAC-CE.

21. The method of claim 19 further comprising stopping monitoring the RS from the transmitting WTRU.

22. The method of claim 19 further comprising stopping transmitting of CSI feedback to the transmitting WTRU.

23. The method of claim 19 further comprising sending an indication of RS deactivation to the controlling device.

24. The method of claim 23, wherein the indication of RS deactivation is sent upon expiry of an inactivity timer when no data is received from the transmitting WTRU.

25. A receiving wireless transmit/receive unit (WTRU) comprising:
a processor configured to:
sending a reference signal (RS) request to a controlling device;
receive, from a transmitting WTRU, a message indicating a reference signal (RS) transmission activation;
monitoring a reference signal (RS) from the transmitting WTRU; and
sending a channel state information (CSI) feedback to the transmitting WTRU.

26. The WTRU of claim 25, wherein the RS request to is sent to the controlling device via a physical uplink control channel (PUCCH), a physical uplink shared channel (PUSCH) via a MAC-CE, a D2D PUCCH, or a D2D PUSCH via a MAC-CE.

27. The WTRU of claim 25, wherein the processor is further configured to stop monitoring the RS from the transmitting WTRU.

28. The WTRU of claim 25, wherein the processor is further configured to stop transmitting of CSI feedback to the transmitting WTRU.

29. The WTRU of claim 25, wherein the processor is further configured to send an indication of RS deactivation to the controlling device.

30. The WTRU of claim 29, wherein the indication of RS deactivation is sent upon expiry of an inactivity timer when no data is received from the transmitting WTRU.

* * * * *